United States Patent [19]

Theysohn et al.

[11] Patent Number: 4,574,131

[45] Date of Patent: Mar. 4, 1986

[54] PREPARATION OF HIGH-IMPACT NYLON MOLDING MATERIALS

[75] Inventors: Rainer Theysohn, Frankenthal; Hans G. Dorst, Deidesheim; Graham E. McKee, Weinheim; Rolf Steinberger, Schifferstadt; Walter Ziegler, Edingen-Neckarhausen; Franz Zahradnik, Ludwigshafen, all of Fed. Rep. of Germany

[73] Assignee: BASF Aktiengesellschaft, Fed. Rep. of Germany

[21] Appl. No.: 645,813

[22] Filed: Aug. 30, 1984

[30] Foreign Application Priority Data

Sep. 2, 1983 [DE] Fed. Rep. of Germany ........ 3331730

[51] Int. Cl.[4] ............................................. C08K 3/34
[52] U.S. Cl. .................................... 523/209; 524/538
[58] Field of Search ................ 523/209, 205; 524/507, 524/538; 428/378

[56] References Cited

U.S. PATENT DOCUMENTS 4,246,371  1/1981  Meyer et al. ..................... 525/183
4,289,672  9/1981  Friederich et al. ................ 524/114
4,381,366  4/1983  Sanderson et al. ................ 524/504

FOREIGN PATENT DOCUMENTS 129548   1/1978   German Democratic Rep. ..................................... 523/209
1095700  12/1967  United Kingdom ............... 523/209

OTHER PUBLICATIONS

Fikentscher "Cellulose-Chemie", Band 13 (1932).
"Angewandte Chemie", Band 82 (1970), Nr. 2.

Primary Examiner—Lewis T. Jacobs
Attorney, Agent, or Firm—Keil & Weinkauf

[57] ABSTRACT

A process for the preparation of high-impact nylon molding materials, containing 30–88% by weight of a thermoplastic nylon, 10–50% by weight of an organosilane-coated silicate reinforcing filler, 0.1–5% by weight of a polyurethane ionomer, 2–30% by weight of a carboxyl-containing thermoplastic elastomer and, where appropriate, effective amounts of conventional additives, by mixing the silicate filler, coated with an organosilane and a polyurethane ionomer, with the thermoplastic elastomer and the nylon at above the melting point of the nylon, wherein, in a first stage, the silicate filler coated with an organosilane and a polyurethane ionomer is mixed with the nylon at above the melting point of the latter, and in a second stage the thermoplastic elastomer is finely dispersed in the filler-containing nylon at above the melting point of the latter.

1 Claim, No Drawings

PREPARATION OF HIGH-IMPACT NYLON MOLDING MATERIALS

The present invention relates to the preparation of high-impact polymer blends based on nylons, finely divided silicate reinforcing fillers which are specially coated, and thermoplastic elastomers.

The mechanical properties of polymers often depend on the nature of their pretreatment. Various methods of increasing the toughness, flexibility and rigidity of nylons have been disclosed.

Thus, German Laid-Open Application DE-OS 2,713,537, teaches that the impact strength of nylon 6 may be improved by incorporating ternary copolymers which contain carboxyl groups. The resulting products are however insufficiently rigid for special applications. To increase the rigidity of the polymers, nylon molding materials have also been provided with mineral fillers. European Patent 21,303 discloses nylon molding materials which contain silicate fillers and grafted elastomers. However, it has been found that the bonding of the fillers to the thermoplastic constituents of the molding material leaves something to be desired. Nylon molding materials, containing a silicate filler, which may be modified with elastomers to improve the toughness have also been proposed, the filler being coated with an organosilane and a polyurethane ionomer. However, it has been pointed out that the quality of the resulting molding materials is not always equal to requirements.

It is an object of the present invention to provide thermoplastic molding materials containing thermoplastic nylons, finely divided silicate fillers coated with an organosilane and a polyurethane ionomer and, in addition, thermoplastic elastomers possessing carboxyl groups, which molding materials combine high rigidity and strength with improved fracture toughness and notched impact strength.

We have found that this object is achieved by employing a process for the preparation of high-impact nylon molding materials, containing 30-88% by weight of a thermoplastic nylon, 10-50% by weight of an organosilane-coated silicate reinforcing filler, 0.1-5% by weight of a polyurethane ionomer, 2-30% by weight of a carboxyl-containing thermoplastic elastomer and, where appropriate, effective amounts of conventional additives, by mixing the silicate filler, coated with an organosilane and a polyurethane ionomer, with the thermoplastic elastomer and the thermoplastic nylon at above the melting point of the nylon, wherein, in a first stage, the silicate filler coated with an organosilane and a polyurethane ionomer is mixed with the nylon at above the melting point of the latter, and in a second stage the thermoplastic elastomer is finely dispersed in the filler-containing nylon at above the melting point of the latter.

The novel process has the advantage that reinforced high-impact nylon molding materials are obtained which exhibit a uniformly high level of mechanical properties, in particular in respect of tensile strength, impact strength, notched impact strength and fracture toughness. The process according to the invention was not obvious per se, since a two-fold heat exposure of the nylon was to be regarded as detrimental and therefore, instead, a lowering of the quality was to be expected. This was all the more so since, according to European Patent 21,303, the nature and sequence of incorporation of the additives into the nylon were not expected to have an effect, since the said patent states that the graft products were preferably incorporated conjointly with glass fibers and/or other fillers and reinforcing agents.

The thermoplastic nylons used are preferably saturated linear nylons having a K value (measured by the method of Fikentscher, Cellulosechemie, volume 13 (1932), page 58, in 1% strength by weight solution in concentrated sulfuric acid) of 60-85. Suitable nylons are, for example, polycaprolactam, polyhexamethyleneadipamide, polyhexamethylenesebacamide, polylauryllactam, polyundecamide and nylon homopolymers and copolymers obtained using adipic acid, azelaic acid, sebacic acid, dodecanedicarboxylic acid or terephthalic acid, on the one hand, and hexamethylenediamine, trimethylhexamethylenediamine, bis-(4-aminocyclohexyl)-methane and 2,2-bis-(4-aminocyclohexyl)-propane, on the other hand, as well as nylon copolymers which are obtained by polycondensation of lactams conjointly with the above dicarboxylic acids and diamines. Polycaprolactam and polyhexamethyleneadipamide are the products of particular industrial importance.

Suitable silicate fillers are glass fibers, preferably made of E-glass, which are conventionally marketed for reinforcing nylon molding materials. The glass fibers present in the molding material in general have a length of 0.1-0.5 mm, preferably 0.15-0.30 mm, and a diameter of about 6-20 $\mu$m, preferably 10-14 $\mu$m. Other preferred silicate fillers are those possessing free OH groups on their surface, such as calcined kaolin, non-calcined kaolin, mica, wollastonite, quartz, zirconium silicate or amorphous $SiO_2$. The fillers are employed in an amount of from 10 to 50% by weight, especially from 10 to 40% by weight, based on the molding material. The particle size of the above fillers is advantageously 0.10-10 $\mu$m, preferably 0.05-5 $\mu$m, while their specific surface area is advantageously greater than 6 $m^2/g$, in particular greater than 10 $m^2/g$.

The silicate fillers are coated with an organosilane, advantageously in an amount of 0.1-3% by weight, especially 0.5-2% by weight. In addition, the silicate fillers are coated with a polyurethane ionomer. The amount is 0.1-5% by weight, based on the total molding material, an amount of 0.5-3% by weight having proved particularly suitable.

Suitable organosilanes are the conventional products known for use in coating glass fibers or fillers, such as aminoalkylsilanes, especially aminoalkyltrialkoxysilanes, e.g. $\gamma$-aminopropyltriethoxysilane.

The polyurethane ionomers used are polyurethanes which contain ionic centers at sizable intervals in their molecules. They are heteropolymers having a pronounced segment structure (cf. Angew. Chemie 1970, No. 2, pages 53–63). As is known, the polyurethane ionomers are high molecular weight segment polymers which associate to form macromolecular structures, resulting in particle weights of greater than 500,000. As a result of inter-chain interactions (Coulombic forces and hydrogen bridges), they have properties similar to those of crosslinked elastomers. Ionomers present in polar organic solvents spontaneously form, on addition of water, stable aqueous dispersions with the ionomer as the disperse phase, so that the emulsification normally required can be dispensed with. After the organic solvent has been removed, the polyurethane ionomers are left as dispersions free from emulsifier and solvent.

The polyurethane ionomers are usually synthesized from polyesters of aliphatic dicarboxylic acids and diols, with molecular weights of 1000–5000, as the polyol component and aliphatic, araliphatic or aromatic diisocyanates as the polyisocyanate component, together with salts of diaminocarboxylic acids to produce the ionic centers in the polyurethane.

Exceptionally water-resistant polyurethane ionomers are those which are additionally chemically crosslinked by polyisocyanates or other reactive components, such as formaldehyde or its derivatives. Such polymers are therefore particularly suitable for use in coating the filler.

The polyurethane ionomers can be prepared by various processes known to a man skilled in the art, for example by the emulsifier/shearing process, the acetone process or the melt dispersion process (cf. Angewandte makromolekulare Chemie, 26, 85 and 101).

Preferred dispersions of polyurethane ionomers are those described in more detail in, for example, Angewandte Chemie, 82 (1970), 53. Other suitable ionomer dispersions are those obtained by the melt dispersion process, as disclosed in German Laid-Open Applications DE-OS 1,170,068 and DE-OS 1,913,271.

The best properties are obtained with dispersions wherein the dispersed particles have a mean diameter of less than 1 micron and especially of from 0.05 to 0.5 micron. Further preferred polyurethane ionomer dispersions are those which contain 5–30 milliequivalents of ionic groups per 100 g of solids.

To achieve optimum properties it is moreover desirable that the dispersed polyurethane ionomers should by themselves dry to give high molecular weight polymers possessing a good pattern of properties. Preferred polyurethanes are those which, when their dispersion is cast on a flat substrate and allowed to dry, give a film with the following properties: tensile strength greater than 50 kp/cm$^2$, preferably greater than 100 kp/cm$^2$; elongation at break 100–600%; Shore A hardness 50–90; water swelling at 20° C. less than 30%.

The polyurethane ionomers are as a rule applied in the form of an aqueous dispersion which contains 10–60% by weight, preferably 20–50% by weight, of solids. It has proved advantageous to apply the above organosilanes conjointly with the polyurethane ionomers onto the fillers.

The filler coated with the aqueous dispersion of the polyurethane ionomer is then dried, advantageously at 80°–120° C., and if appropriate is subjected to a heat aftertreatment for 10–60 minutes.

Preferred thermoplastic elastomers are copolymers of ethylene with propylene, vinyl esters or fatty acids having 2 to 4 carbon atoms or primary or secondary $C_2$–$C_8$-alkyl acrylates or methacrylates, especially n-butyl acrylate, which copolymers contain, as copolymerized units, monomers possessing carboxyl groups, e.g. acrylic acid, methacrylic acid, maleic acid or maleic anhydride, in an amount of 0.5–15% by weight. Advantageously, these copolymers are not crosslinked, i.e. they should dissolve to the extent of not less than 90% in hot solvents, such as toluene, ethylbenzene or tetrachloroethylene. Preferably, copolymers of 55–79.5% by weight of ethylene, 20–40% by weight, especially 25–38% by weight, of a primary or secondary $C_2$–$C_8$-alkyl acrylate or methacrylate, preferably n-butyl acrylate, and 0.5–8% by weight of a monomer containing acid groups, e.g. methacrylic acid or acrylic acid, or a monomer possessing masked acid groups, which form carboxylic acid groups under the processing conditions or polymerization conditions, e.g. maleic anhydride or tert.-butyl acrylate or methacrylate, are used.

A further group of preferred thermoplastic elastomers are copolymers of ethylene with propylene, ethylene with vinyl esters of $C_1$–$C_4$-fatty acids, ethylene with $C_2$–$C_8$-alkyl acrylate or methacrylate, and styrene-butadiene or styrene-isoprene block polymers, with the monomers containing carboxyl groups, e.g. acrylic acid, methacrylic acid, maleic acid or maleic anhydride, having been grafted on subsequently. A common method of grafting is described in, for example, European Patent 21,303. A further method of grafting-on monomers containing carboxyl groups is described in, for example, German Laid-Open Application DE-OS 2,703,416.

Preferred thermoplastic elastomers have a melting range or melting point of from 50° to 100° C. and a glass transitiom temperature of below −20° C. Advantageously, thermoplastic elastomers which have a modulus of shear (according to DIN 53,445) at −20° C. of less than 200, especially less than 100, N/mm$^2$, are used.

The preferred thermoplastic elastomers are in general high molecular weight products and have a melt index MFI 190/2.16 (DIN 53,735) of 1–20. The thermoplastic elastomers are used in an amount of 2–30% by weight, especially 5–25% by weight, based on the total molding material.

In addition, the novel molding materials can be modified by conventional additives, such as heat stabilizers and light stabilizers, lubricants and mold release agents and colorants, e.g. dyes and pigments, in the conventional effective amounts.

The sequence in which the individual components are brought together is an essential feature of the invention. According to the invention, in a first stage the silicate fillers coated with an organosilane and a polyurethane ionomer are mixed with the nylon at above the melting point of the latter, for example in the case of nylon 6 - at 250°–270° C. The temperature depends essentially on the melting point of the particular nylon used. Examples of suitable mixing apparatuses are single-screw or multi-screw extruders, as conventionally used in industry. As a rule, the mixture thus obtained is extruded as strands which are cooled and granulated. The nylon thus produced and containing coated silicate fillers is then, for example, blended with the thermoplastic elastomer and in a second stage the thermoplastic elastomer is finely dispersed in the nylon at above the melting point of the latter. This, for example, is also effected by means of the above apparatuses, such as screw extruders. It has proved advanageous to employ a mixing process which is so intensive that the thermoplastic elastomer is present in individual particles of <3 μm, preferably <1 μm, in the nylon. The melt thus obtained is then extruded as strands, which are cooled and granulated. An alternative version of the second stage is to employ the thermoplastic elastomer in the form of a concentrate in the nylon.

The novel molding materials are useful for the production of shaped articles by injection molding or extrusion.

The Examples which follow illustrate the process of the invention.

EXAMPLE 1

Endless strands of E-glass fibers free from surface treatment were impregnated with a dispersion containing 50% by weight of an ionomeric polyurethane and 5% by weight of γ-aminopropyltriethoxysilane and were dried. The dried strands contained 1.2% by weight of solids, based on glass fibers. The thus coated glass fibers were worked into a molten polycaprolactam of K value 72, in a twin-screw extruder, under conditions which gave a glass fiber content of 35.3% by weight and a mean glass fiber length of about 0.25 mm. The melt was then discharged and extruded as strands which were cooled and granulated. 85 parts of the granules thus obtained were blended with 15 parts of a copolymer of ethylene with 4% by weight of acrylic acid and 30% by weight of n-butyl acrylate, of melt index MFI 8 (g/10 min at 190° C./2.16 kg), and the blend was remelted in an extruder and homogenized. The melt was then extruded as strands which were cooled and granulated, and test specimens were injection-molded from the granules obtained. The mechanical properties found are listed in Table 1 below.

EXAMPLE 2 (Comparative)

The procedure followed was as in Example 1 except that the glass fibers used had been treated solely with a 10% strength aqueous solution of γ-aminopropyltriethoxysilane. In other respects conditions were as in Example 1.

EXAMPLE 3 (Comparative)

Glass fibers were coated as described in Example 1. 58 parts of a polycaprolactam of K value 72 were blended with 15 parts of a copolymer of ethylene with 4% by weight of acrylic acid and 30% by weight of n-butyl acrylate, the blend was melted in an extruder and 30 parts of glass fibers were worked into the melt. The melt was extruded as strands which were cooled and granulated, and test specimens were injection-molded from the granules. The mechanical properties are shown in Table 1 below.

TABLE 1

| Example | Tensile strength (Nmm$^2$) | Mean glass fiber length (mm) | Impact strength (kJm$^{-2}$) | Fracture toughness (Nm) | Notched impact strength (kJm$^{-2}$) |
| --- | --- | --- | --- | --- | --- |
| 1 | 120 | 0.18 | 72 | 17 | 23 |
| 2 | 110 | 0.16 | 50 | 5 | 15 |
| 3 | 75 | 0.25 | 25 | 1.5 | 11 |

EXAMPLE 4

Untreated endless strands of E-glass fibers were impregnated with an aqueous dispersion containing 50% by weight of an ionomeric polyurethane and 5% by weight of γ-aminopropyltriethoxysilane, and were dried. The dried strands contained 1.2% by weight of solids, based on glass.

To a dispersion of the same composition was added a twofold amount of water and 20% of wollastonite having a mean particle diameter of 10 μm were then stirred in, after which the batch was mixed for 30 minutes. It was then filtered on a sintered glass suction filter and dried at 80° C. The weight increase of the wollastonite was 2.1% by weight.

20 parts of the wollastonite thus treated were mixed with 65 parts of polycaprolactam of K value 72, the mixture was melted and compounded in an extruder and 10 parts of the coated glass fibers were added to the fluid mixture. The mixture was extruded as strands which were cooled and granulated. 95 parts of the granules thus obtained were blended with 5 parts of a copolymer of ethylene with 4% of acrylic acid and 30% of n-butyl acrylate, the blend was again melted in an extruder and homogenized and the melt was extruded as strands, which were cooled and granulated. The mechanical properties of the test specimens injection-molded therefrom are shown in Table 2.

EXAMPLE 5 (Comparative)

The procedure described in Example 4 was followed, except that the wollastonite used was coated only with γ-aminopropyltriethoxysilane. In other respects there were no differences from Example 4. The properties measured on injection moldings are shown in Table 2.

EXAMPLE 6 (Comparative)

65 parts of polycaprolactam of K value 72 and 5 parts of a copolymer as described in Example 4 were mechanically blended with 20 parts of wollastonite coated as described in Example 4, and the blend was fed to a twin-screw extruder where the polymers were melted. Downstream, 10 parts of glass fibers coated as described in Example 4 were added to the molten mixture and the whole was dispersed homogeneously. The melt was extruded as strands, which were cooled and granulated. The mechanical properties of the injection moldings produced from the granules are shown in Table 2.

TABLE 2

| Example | Tensile strength (Nmm$^{-2}$) | Impact strength (kJm$^{-2}$) | Fracture toughness (Nm) | Notched impact strength (kJm$^{-2}$) |
| --- | --- | --- | --- | --- |
| 4 | 120 | 61 | 11 | 17 |
| 5 | 118 | 35 | 2 | 12 |
| 6 | 100 | 33 | 6 | 13 |

We claim:

1. A process for the preparation of high-impact nylon molding materials, containing 30–88% by weight of a thermoplastic nylon, 10–50% by weight of an organosilane-coated silicate reinforcing filler, 0.1–5% by weight of a polyurethane ionomer, 2–30% by weight of a carboxyl-containing thermoplastic elastomer and, as an option, effective amounts of conventional additives, wherein, in a first stage, the silicate filler coated with an organosilane and a polyurethane ionomer is mixed with the nylon at above the melting point of the latter, and in a second stage the thermoplastic elastomer is finely dispersed in the filler-containing nylon at above the melting point of the latter.

* * * * *